Oct. 2, 1928.
J. W. MacCLATCHIE
1,686,090
PISTON PACKING
Filed Dec. 22, 1926
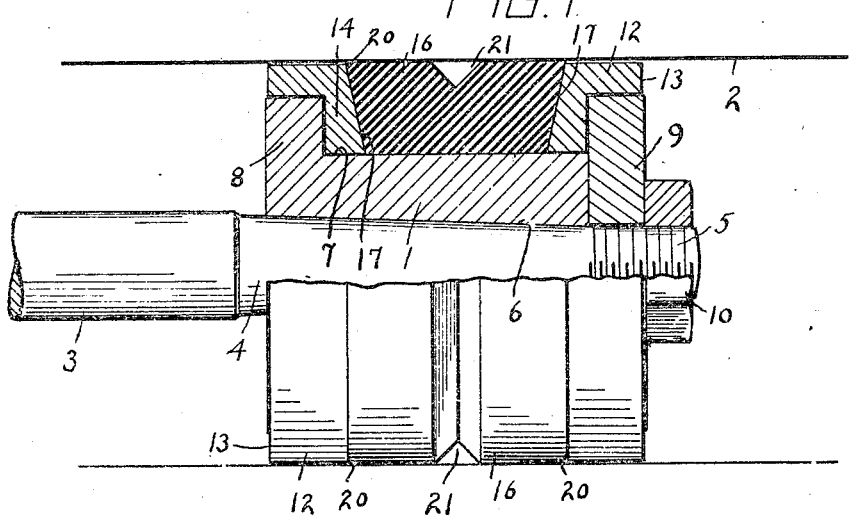
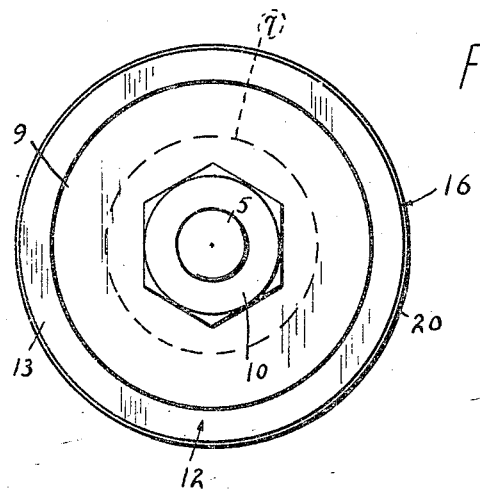
INVENTOR.
JOHN W. MAC CLATCHIE
BY R. W. Smith
ATTORNEY.

Patented Oct. 2, 1928.

1,686,090

UNITED STATES PATENT OFFICE.

JOHN W. MacCLATCHIE, OF COMPTON, CALIFORNIA.

PISTON PACKING.

Application filed December 22, 1926. Serial No. 156,284.

This invention is a piston packing; and it is the object of the invention to axially compress the packing by the pressure in the cylinder in which the piston reciprocates, in order to radially expand the packing into tight engagement with the cylinder wall.

It is a further object of the invention to mount the packing between abutment members which are slidable axially of the piston and present end abutment surfaces to the pressure in the cylinder, so that the pressure tends to slide the abutment members toward one another and thereby axially compress the interposed packing and cause its radial expansion.

It is a still further object of the invention to limit movement of the slidable abutment members away from one another so as to maintain the parts in assembled relation; and the improved construction also provides for convenient replacement of the packing and the abutment members when they become worn, while continuing to use the same main portion of the piston which is not subject to wearing action, thereby providing for quick and inexpensive renewal of the piston.

It is a still further object of the invention to arrange the parts so that maximum radial expansion will occur at the ends of the packing annulus, thereby insuring a tight packing engagement and wiping the wall of the cylinder free of foreign matter without the possibility of such foreign matter seating between the packing and the cylinder wall and scoring the latter.

Further objects of the invention will be understood from the following description of the accompanying drawings, in which:

Fig. 1 is a side elevation of the improved construction, partly in axial section.

Fig. 2 is an end view of the same.

The improved packing is mounted on a piston 1 which reciprocates in any usual cylinder 2, the piston being reciprocated by a usual piston rod 3 having a tapering end 4 terminating in a threaded pin 5, and received in a usual tapering bore 6 extending through the piston.

A cylindrical peripheral surface 7 forms a seat for the packing and extends to one end of piston, and the opposite end of the piston forms an annular flange 8 projecting radially beyond surface 7 for an appreciable distance but of a diameter considerably less than that of cylinder 2. A disc 9 of the same diameter as flange 8 is slidably received on threaded pin 5 against the other end of peripheral surface 7, and is removably held in place by a nut 10 threaded on pin 5, the members 8 and 9 thus forming radially projecting abutments at the respective ends of surface 7, with said abutments spaced a considerable distance from the wall of cylinder 2.

Sleeves 12 of non-distortable material such as a suitable metal are slidably mounted on members 8—9 and are slidable in cylinder 2 without binding engagement, the outer ends of the sleeves forming annular abutment surfaces 13 of appreciable width in planes at right angles to the axis of the piston and subject to the pressure in cylinder 2 so as to tend to slide the sleeves toward one another. The inner ends of the sleeves form interior annular flanges 14 extending inwardly to the peripheral surface 7 and slidable thereon, with the outer surfaces of the interior flanges adapted for abutment against members 8—9 to limit movement of sleeves 12 away from one another.

A packing annulus 16 which may be of any usual packing material, is mounted on peripheral surface 7 between the sleeves 12, and is of a diameter adapted for packing engagement with the wall of cylinder 2 when the packing annulus is axially compressed. The ends of the packing annulus and the inner surfaces of the interior flanges of sleeve 12, form co-operating abutment faces 17 so that the pressure in cylinder 2 sliding the sleeves 12 toward one another will axially compress packing 16 for radial expansion into packing engagement with the wall of cylinder 2.

The co-operating abutment surfaces 17 at the respective ends of the packing annulus preferably convergently taper toward the axis of the piston as shown in Fig. 1, so that axial compression of the packing by the sliding movement of sleeves 12, will tend to cause maximum radial expansion of the packing at the immediate ends of its peripheral surface as shown at 20.

To further insure maximum packing engagement at the ends 20, the medial portion of the packing annulus may be weakened, as for example by means of an annular recess 21 in its peripheral surface whereby the medial portion of the packing annulus is of reduced thickness as compared with the relatively greater uniform thickness of the end portions of the annulus, this construction resulting in greater radial expansion of the packing at its ends than at its medial portion, and thereby maintaining the tightest packing engagement at ends 20 so as to prevent foreign matter of any kind seating between the packing and the cylinder wall.

By removing nut 10 and disc 9, the packing annulus and sleeves 12 may be readily replaced when worn, thereby renewing the piston without the expense of replacing the main portion 1 of the piston which is not subject to wear. The outer end surfaces of sleeves 12 present a considerable area to the pressure in cylinder 2, so that such pressure will positively force the sleeves toward one another and thereby automatically take up wear and maintain a tight packing engagement by annulus 16.

The sleeves 12 fit comparatively snugly in cylinder 2, so that the pressure in the cylinder is directed against the sleeves which are preferably of metal, and is not directed immediately against the packing annulus which is of usual relatively yieldable material. Maximum packing engagement is thus obtained with minimum wear.

The arrangement also provides for the necessary radial expansion of packing 16 by relatively slight axial compression, it being noted that the required sliding movement of sleeves 12 toward one another is comparatively slight as shown in Fig. 1, although if the packing annulus is badly worn, the sleeves 12 are adapted for the necessary sliding movement to take up appreciable wear.

I claim:

1. A piston adapted for reciprocation in a cylinder containing a medium under pressure, a packing annulus on the piston, and an abutment slidable relative to the piston responsive to the pressure in the cylinder and engaging the end of the packing for axially compressing the packing and thereby radially expanding it into packing engagement with the wall of the cylinder, the packing annulus being recessed medially of its length to reduce its thickness and having end portions of uniform relatively greater thickness extending from said medial recess to the respective ends of the annulus.

2. A member adapted for movement in an inclosure containing a medium under pressure, sleeves slidable on the respective ends of the member responsive to the pressure in the inclosure beyond the respective ends of the member, and a packing annulus on the member between the sleeves adapted for end engagement by the sliding sleeves to axially compress the packing annulus and thereby radially expand it into engagement with the wall of the inclosure, the packing annulus being recessed medially of its length to reduce its thickness and having end portions of uniform relatively greater thickness extending from said medial recess to the respective ends of the annulus.

3. A piston having radially projecting abutments at its respective ends, sleeves of non-distortable material slidable on said abutments and having interior flanges at their inner ends engaging said abutments for limiting sliding movement of said sleeves away from one another, and a packing annulus on the piston between the sleeves adapted for end engagement by said interior flanges to axially compress the packing by sliding movement of the sleeves toward one another and thereby radially expand the packing beyond the exterior periphery of the sleeves, the packing annulus being recessed medially of its length to reduce its thickness and having end portions of uniform relatively greater thickness extending from said medial recess to the respective ends of the annulus.

4. A member adapted for movement in an inclosure containing a medium under pressure, a packing annulus on said member, and an abutment slidable relative to the member responsive to the pressure in the inclosure and engaging the end of the packing for axially compressing the packing and thereby radially expanding it into packing engagement with the wall of the inclosure, the outer periphery of the packing annulus being recessed medially of its length to reduce its thickness with the end portions of said outer periphery of the annulus of appreciable length and substantially parallel to the axis of the movable member.

5. A member adapted for movement in an inclosure containing a medium under pressure, sleeves slidable on the respective ends of the member responsive to the pressure in the inclosure beyond the respective ends of the member, and a packing annulus on the member between the sleeves adapted for end engagement by the sliding sleeves to axially compress the packing annulus and thereby radially expand it into engagement with the wall of the inclosure, the outer periphery of the packing annulus being recessed medially of its length to reduce its thickness with the end portions of said outer periphery of the annulus of appreciable length and substantially parallel to the axis of the movable member.

6. A piston having radially projecting abutments at its respective ends, sleeves of non-distortable material slidable on said abutments and having interior flanges at their inner ends engaging said abutments for limiting sliding movement of said sleeves away from one another, and a packing annulus on the piston between the sleeves adapted for end engagement by said interior flanges to axially compress the packing by sliding movement of the sleeves toward one another and thereby radially expand the packing beyond the exterior periphery of the sleeves, the outer periphery of the packing annulus being recessed medially of its length to reduce its thickness with the end portions of said outer periphery of the annulus of appreciable length and substantially parallel to the axis of the piston.

7. A packing annulus adapted for axial compression to radially expand the same, the outer periphery of the packing annulus being recessed medially of its length to reduce its thickness with the end portions of said outer periphery of the annulus of appreciable length and substantially parallel to the bore of the annulus.

In testimony whereof he has affixed his signature to this specification.

JOHN W. MacCLATCHIE.